(12) United States Patent
Zhang et al.

(10) Patent No.: US 10,417,703 B2
(45) Date of Patent: Sep. 17, 2019

(54) METHOD AND SYSTEM FOR IMPLEMENTING SELF-IMPOSED SPENDING LIMIT

(71) Applicant: MasterCard International Incorporated, Purchase, NY (US)

(72) Inventors: Tong Zhang, Greenwich, CT (US); Edward Lee, Scarsdale, NY (US); Qian Wang, Ridgefield, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 176 days.

(21) Appl. No.: 14/481,289

(22) Filed: Sep. 9, 2014

(65) Prior Publication Data
US 2016/0071201 A1    Mar. 10, 2016

(51) Int. Cl.
*G06Q 40/00* (2012.01)

(52) U.S. Cl.
CPC .................................. *G06Q 40/00* (2013.01)

(58) Field of Classification Search
CPC ...... G06Q 10/087; G06Q 20/10; G06Q 40/00; G06Q 20/04; G06Q 30/0603
See application file for complete search history.

(56) References Cited

U.S. PATENT DOCUMENTS

| | | | |
|---|---|---|---|
| 6,636,833 B1 | 10/2003 | Flitcroft et al. | |
| 7,136,835 B1 | 11/2006 | Flitcroft et al. | |
| 7,567,934 B2 | 7/2009 | Flitcroft et al. | |
| 7,571,142 B1 | 8/2009 | Flitcroft et al. | |
| 7,593,896 B1 | 9/2009 | Flitcroft et al. | |
| 8,438,091 B1* | 5/2013 | Berman | G06Q 40/00 705/35 |
| 2001/0001856 A1* | 5/2001 | Gould et al. | 705/39 |
| 2009/0037333 A1 | 2/2009 | Flitcroft et al. | |
| 2009/0070260 A1 | 3/2009 | Flitcroft et al. | |
| 2009/0134217 A1 | 5/2009 | Flitcroft et al. | |
| 2012/0239564 A1* | 9/2012 | Summerrow | G06Q 20/28 705/41 |
| 2014/0244503 A1 | 8/2014 | Sadlier | |

\* cited by examiner

*Primary Examiner* — Sonji N Johnson
(74) *Attorney, Agent, or Firm* — Buchanan Ingersoll & Rooney PC

(57) ABSTRACT

A method for imposing spending limits includes: storing data related to a payment account; receiving a spending limit request from a consumer associated with the account, the request including a spending target and spending category; generating a budget including a starting spending limit and two or more periods of time; applying, to the account, a spending limit, such that a value of transactions funded by the account during a first period of time and related to the spending category cannot exceed the applied spending limit, wherein the applied spending limit is the starting spending limit; decreasing the applied spending limit after the first period of time, such that transactions funded by the account during a second period of time cannot exceed the decreased applied spending limit; and repeating the decreasing step until the applied spending limit is equal to the spending target.

20 Claims, 10 Drawing Sheets

METHOD AND SYSTEM FOR IMPLEMENTING SELF-IMPOSED SPENDING LIMIT

FIELD

The present disclosure relates to the implementation of self-imposed spending limits and the calculation of assisted categorized budgeting for a transaction account using historical purchase data and data from other, similarly situated consumers.

BACKGROUND

Many consumers create budgets for themselves in an effort to control and track their spending, build up savings, save money for a large purchase or vacation, or to achieve some other goal. In an effort to assist consumers with budgeting, many software programs and other tools have been developed that consumers can use. Many of these programs and tools enable a consumer to link to their online banking accounts to pull transaction data and provide a user interface for the consumer to set budgets and categorize transactions in the budgets.

However, these programs may often suffer from a number of disadvantages. For example, by requiring consumers to provide usernames and passwords for online banking accounts, many consumers may be uncomfortable using such a program and the gathering and storage of consumer login data may make the program a high value target for hacking and fraud. In addition, these programs often require the consumer to set their own budget categories and limits arbitrarily or based on their past transactions. For consumers who may be overspending or using their money inefficiently, such categories and limits may cause the consumer to continue their overspending without the knowledge that there may be better budgeting practices.

Furthermore, while many of these budgeting programs and tools can monitor transactions and spending in a consumer-set budget category, it is often up to the consumer themselves to ensure that they stay within a budget. In many instances, a consumer may continue to transact even when a budget is exceeded. Therefore, a consumer with low willpower may find themselves unable to curb spending or follow a budget, despite all of the tools provided by the budgeting program. The current product offerings present a technical impediment to these goals Thus, there is a need for a technical solution to assist consumers in the creation of a budget and to assist with the compliance with self-imposed spending limits.

SUMMARY

The present disclosure provides a description of systems and methods for imposing spending limits to lower purchase spending.

A method for imposing spending limits to lower purchase spending includes: storing, in an account database, an account profile, wherein the account profile includes data related to a payment account including at least an account identifier; receiving, by a receiving device, a spending limit request from a consumer associated with the account profile, wherein the request includes at least a spending target and a spending category; generating, by a processing device, a budget for the payment account related to the account profile including at least a starting spending limit and two or more periods of time; applying, to the account profile, a spending limit, such that a value of transactions funded by the related payment account during a first period of time and related to the spending category cannot exceed the applied spending limit, wherein the applied spending limit is the starting spending limit; decreasing, by the processing device, the applied spending limit after the first period of time, such that transactions funded by the related payment account during a second period of time cannot exceed the decreased applied spending limit; and repeating, by the processing device, the decreasing step until the applied spending limit is equal to the spending target.

A system for imposing spending limits to lower purchase spending includes an account database, a receiving device, and a processing device. The account database is configured to store an account profile, wherein the account profile includes data related to a payment account including at least an account identifier. The receiving device is configured to receive a spending limit request from a consumer associated with the account profile, wherein the request includes at least a spending target and a spending category. The processing device is configured to: identify a budget for the payment account related to the account profile including at least a starting spending limit and two or more periods of time; apply, to the account profile, a spending limit, such that a value of transactions funded by the related payment account during a first period of time and related to the spending category cannot exceed the applied spending limit, wherein the applied spending limit is the starting spending limit; decrease the applied spending limit after the first period of time, such that transactions funded by the related payment account during a second period of time cannot exceed the decreased applied spending limit; and repeat the decreasing step until the applied spending limit is equal to the spending target.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
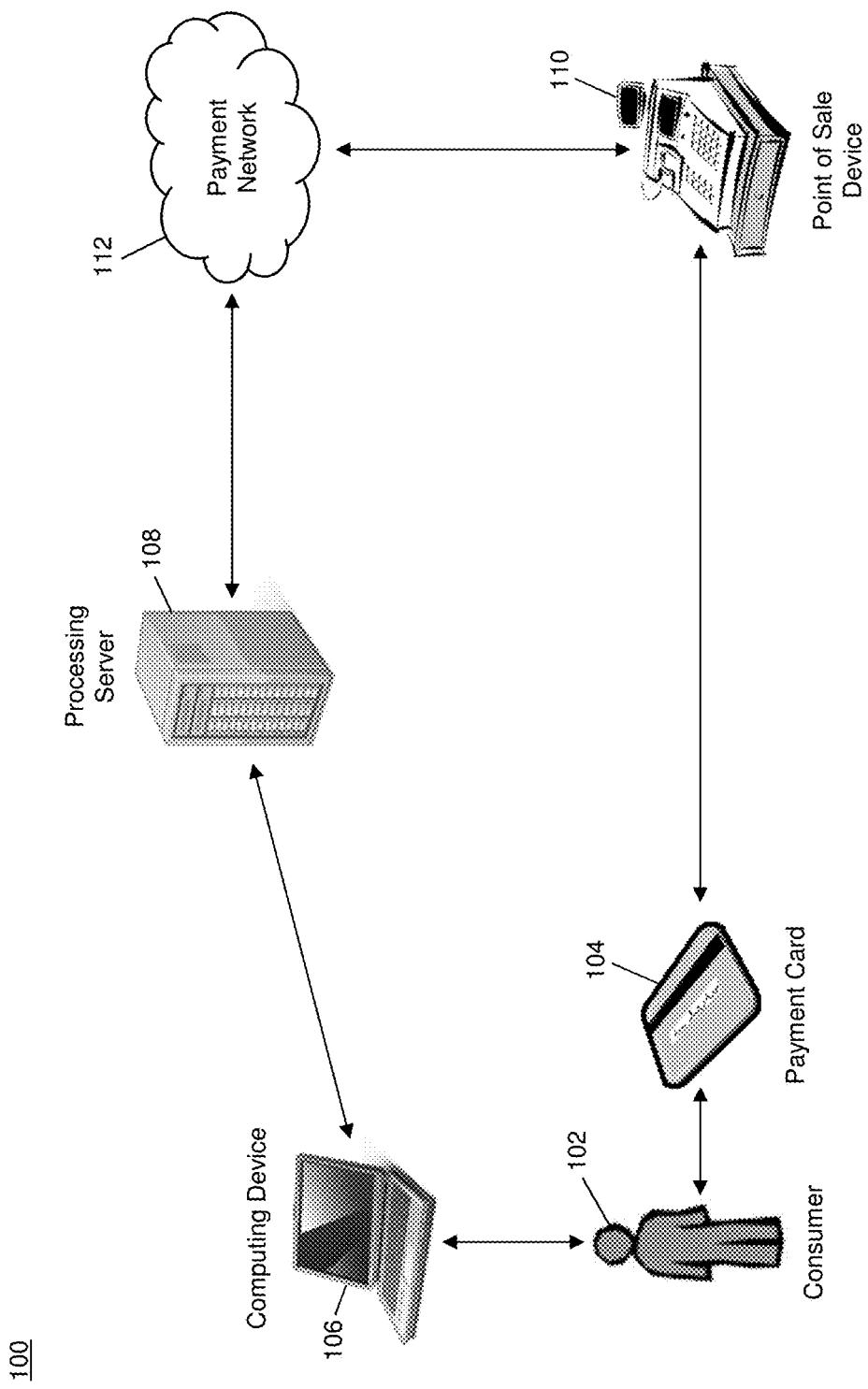
FIG. 1 is a high level architecture illustrating a system for imposing spending limits and assisting with categorized budgets in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated transaction account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

Controlled Payment Number—Controlled payment numbers may be payment numbers associated with a payment account that are subject to one or more rules. In many cases, these rules may be set by a cardholder, such as spending limits, limits on days and/or times of a transaction, limits on merchants or industries, transaction spending or frequency limits, etc. Controlled payment numbers may offer an account holder an opportunity to give payment cards tied to the account to others for use, but subject to rules set by the cardholder, such as an employer distributing cards to employees, or a parent distributing cards to children. Additional detail regarding controlled payment numbers may be found in U.S. Pat. No. 6,636,833, issued Oct. 21, 2003; U.S. Pat. No. 7,136,835, issued Nov. 14, 2006; U.S. Pat. No. 7,571,142, issued Aug. 4, 2009; U.S. Pat. No. 7,567,934, issued Jul. 28, 2009; U.S. Pat. No. 7,593,896, issued Sep. 22, 2009; U.S. patent application Ser. No. 12/219,952, filed Jul. 30, 2008; U.S. patent application Ser. No. 12/268,063, filed Nov. 10, 2008; and U.S. patent application Ser. No. 12/359,971, filed Jan. 26, 2009; each of which are herein incorporated by reference in their entirety.

Point of Sale—A computer or computer system at a location where a consumer places an order and makes payment for goods and/or services, which may be a register or electronic point of sale in physical locations that the customer visits during the transaction as in "bricks and mortar" stores or virtual in e-commerce environments such as online retailers receiving communications from customers over a network such as the Internet.

System for Imposing Spending Limits and Calculating Assisted Categorized Budgets FIG. 1 illustrates a system 100 for the implementation of self-imposed spending limits and the calculating of assisted categorized budgets for consumers based on consumer-supplied data and past purchase behavior.

The system 100 may include a consumer 102. The consumer 102 may conduct payment transactions using a payment card 104. The payment card 104 may be associated with a transaction account for which the consumer 102 may want to establish a budget or impose one or more spending limits. In an effort to receive assistance with the creation of a categorized budget or the imposition of spending limits on the transaction account, the consumer 102 may communicate with a processing server 108. The processing server 108, discussed in more detail below, may be configured to calculate categorized budgets based on consumer data and transaction history of the consumer 102 and other like consumers, and to impose spending limits set by the consumer 102 on the transaction account associated with the payment card 104.

The consumer 102 may communicate with the processing server 108 using a computing device 106. The computing device 106 may be any type of computing device 106 suitable for performing the functions disclosed herein, such as a desktop computer, laptop computer, notebook computer, tablet computer, personal digital assistance, cellular phone, smart phone, smart watch, smart television, etc. The computing device 106 may execute an application program configured to communicate with the processing server 108 to set a budget or impose spending limits. The application program may be a web browsing application program configured to access a web page operated by or on behalf of the processing server 108, an application program designed by or on behalf of the processing server 108 for communication with the processing server 108, or other suitable type of application as will be apparent to persons having skill in the relevant art. In some instances, the consumer 102 may communicate with the processing server 108 using other means, such as telephone, manual input into the processing server 108, communication with a user of the processing server 108, etc.

The processing server 108 may be configured to receive and store transaction data for payment transactions involving the consumer 102. For instance, the consumer 102 may conduct payment transactions at merchant point of sale devices 110 using the payment card 104 for which a budget or spending limit is to be established. Transaction data may be transmitted from the point of sale devices 110 to a payment network 112 for processing using methods and systems that will be apparent to persons having skill in the relevant art. As part of the processing of the transactions, transaction data for the transactions may be transmitted to the processing server 108. In some embodiments, the processing server 108 may be a part of the payment network 112 and may, in some instances, be configured to process the payment transactions.

The processing server 108 may, as discussed in more detail below, be configured to calculate a budget for the transaction account of the consumer 102. The calculated budget may be based on the spending behavior of the consumer 102 as based on the transaction history of the consumer 102. The budget may also be based on other data associated with the consumer, such as consumer income, consumer preferences, etc. For instance, the consumer 102 may request specific levels of spending for specific budget categories. In some instances, the budget may also be based on other consumers, such as consumers similar to the consumer 102, which may be based on similarity in consumer data (e.g., demographics), spending (e.g., overall spending, categorical spending, levels of spending, etc.), spending models and thresholds, and other criteria that will be apparent to persons having skill in the relevant art. U.S. patent application Ser. No. 13/778,302 ("A System and Method for Automatic Thresholding for Payment Card Spend Control"), filed Feb. 27, 2013, herein incorporated by reference, particularly for its discussion of defining initial spending thresholds.

For example, the consumer 102 may request a budget from the processing server 108, and may specify that they prefer a high rate of spending for clothing. The processing server 108 may analyze the consumer's 102 data and transaction history to identify their income and regular spending, and may also identify the spending behaviors of other consumers similar to the consumer 102, to develop a budget with suggested spending in each of a plurality of categories. In some instances, the processing server 108 may adjust the spending level for clothing based on the consumer's 102 request. In other instances, the processing server 108 may identify the overall budget based on other consumers that have a high rate of spending for clothing, and may thus reflect the consumer's 102 request accordingly.

The processing server 108 may also be configured to, as discussed in more detail below, impose a spending limit on the transaction account associated with the payment card 104 as specified by the consumer 102. The consumer 102 may select a spending category for which the consumer 102 wants to set a spending limit, such as to limit spending on fast food, entertainment, clothing, etc. The consumer 102 may also select a spending target, which may be a value to which the consumer 102 wants to lower their spending level. The processing server 108 may then identify a plan to reduce the consumer's 102 spending for the specified category to the spending limit over a period of time.

For example, if the consumer 102 currently spends $200 a month on clothing, but sets a target to spend $100 a month on clothing, the processing server 108 may establish a plan to lower the spending level of the consumer 102 by $25 a month for four months until the spending level of $100 is reached. During the four months, the processing server 108 may provide the spending limit information to the payment network 112 such that any transactions for the spending category, clothing, that exceed the spending limit are to be denied.

In some instances, the consumer 102 may provide additional criteria regarding the imposition of the spending limit, such as rate of decrease, length of time, etc. For example, the consumer 102 may request the spending limit decrease slowly at first, with larger decreases later as they grow accustomed to having a limit. In another example, the consumer 102 may request that the spending limit be reached in three months regardless of the rate of decrease. In some embodiments, the processing server 108 may create a plan for the decreasing of the spending level to the spending limit based on other consumers. For example, the processing server 108 may identify the spending in the specified category for other, similar consumers to identify a suitable rate of decrease or length of time to achieve the set spending limit.

By using transaction history for the consumer 102 and for other consumers similar to the consumer 102, the processing server 108 may be able to provide assistance in setting budgets and in imposing spending limits that may be otherwise unavailable to the consumer 102. The generation of budgets based on similar consumers may provide the consumer 102 with more effective budgeting practices that may have otherwise been unknown to the consumer 102, particularly if the consumer 102 is inexperienced at budgeting, such a person that has recently achieved financial independence. Similarly, the imposition of spending limits on the consumer 102 set by the consumer 102 themselves may enable the consumer 102 to achieve spending targets that they may have lacked the willpower to do otherwise, due to the imposition being made by the third party processing server 108.

Processing Server

Figure 2:
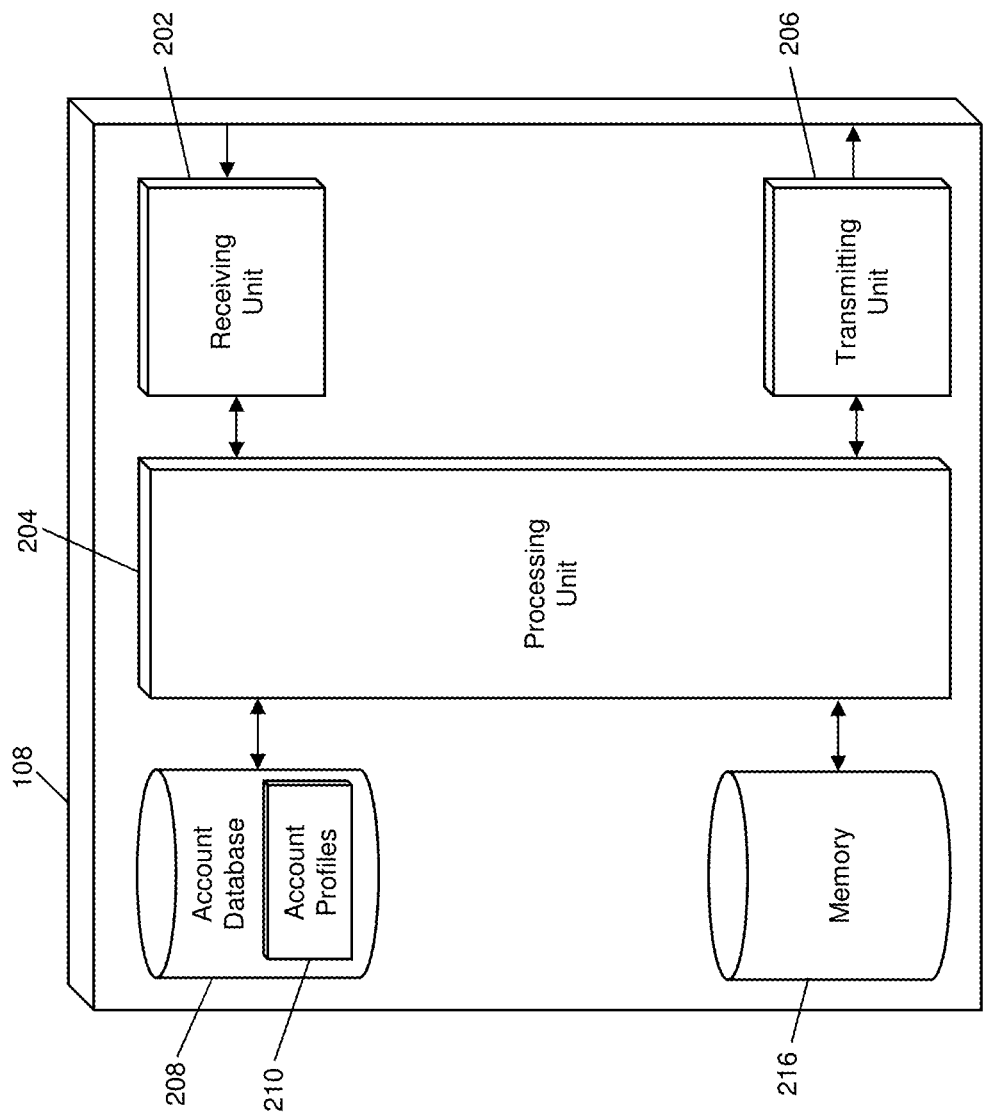
FIG. 2 is a block diagram illustrating the processing server of FIG. 1 for the implementation of self-imposed spending limits and generation of assisted categorized budgets in accordance with exemplary embodiments.

FIG. 2 illustrates an embodiment of the processing server 108 of the system 100. It will be apparent to persons having skill in the relevant art that the embodiment of the processing server 108 illustrated in FIG. 2 is provided as illustration only and may not be exhaustive to all possible configurations of the processing server 108 suitable for performing the functions as discussed herein. For example, the computer system 1000 illustrated in FIG. 10 and discussed in more detail below may be a suitable configuration of the processing server 108.

The processing server 108 may include an account database 208. The account database 208 may be configured to store a plurality of account profiles 210. Each account profile 210 may include data related to a transaction account including at least an account identifier associated with the related transaction account. The account identifier may be an account number, username, e-mail, or other unique value suitable for identification of the account profile 210 and/or related transaction account that will be apparent to persons having skill in the relevant art.

In some embodiments, each account profile 210 may also include consumer data associated with a consumer 102 related to the related transaction account. In such an embodiment, the consumer data may be received from the consumer 102 or from a third party, such as a data reporting agency, by a receiving unit 202. The receiving unit 202 may be configured to receive data over one or more networks via one or more network protocols. The receiving unit 202 may also receive transaction data for a plurality of payment transactions involving the consumer 102 and/or transaction account related to the account profile 210. In such an instance, the transaction data may be stored in the account profile 210.

The receiving unit 202 may also be configured to receive a budget request from the consumer 102. The processing server 108 may further include a processing unit 204. The processing unit 204 may be configured to perform the functions of the processing server 108 discussed herein as will be apparent to persons having skill in the relevant art, including generating a budget for the account profile 210 based on the received budget request. The processing unit 204 may generate the budget for the account profile 210 based on the included transaction data and consumer data, and also based on transaction data included in one or more related account profiles 210. Related account profiles 210 may be identified by the processing unit 204 as being related to the account profile 210 for which the budget is being generated based on consumer data, transaction history, spending levels, categorical spending, etc.

The processing unit 204 may also be configured to generate one or more category budgets as part of the generating of a budget for the account profile 210. In such an instance, the category budget for each category may be based on a spending level for the category, which may be based on transaction history for the consumer 102 in that category (e.g., as stored in the account profile 210), specified by the consumer 102 in the budget request, and/or based on transaction history for that category in related account profiles 210.

The generation of a budget may use one or more rules or algorithms configured to identify categorized budgets based on the information discussed herein and in U.S. patent application Ser. No. 13/778,302, referenced above. The rules or algorithms may be stored in a memory 216 of the processing server 108. The memory 216 may be configured to store data suitable for performing the functions disclosed herein, such as the budgeting rules or algorithms, rules regarding the request and imposition of budgets or spending limits, program code for one or more application programs executed by the processing unit 204, etc.

The processing server 108 may also include a transmitting unit 206. The transmitting unit 206 may be configured to transmit data over one or more networks via one or more network protocols. The transmitting unit 206 may transmit the generated budget to the consumer 102 (e.g., via the computing device 106) in response to the previously received budget request. The transmitting unit 206 may also transmit data to other entities, such as the payment network 112, such as a request for transaction data for one or more specified account profiles 210, such as account profiles for which a budget is requested.

The receiving unit 202 is also configured to receive a spending limit request from the consumer 102 (e.g., via the computing device 106). The spending limit request may include a spending target and a spending category. In some instances, the spending limit request may also include a rate of decrease, a period of decrease, or other criteria suitable for use in imposing the requested spending limit. The processing unit 204 may be configured to generate a budget for the spending category specified in the spending limit request, such as based on the consumer-provided criteria, spending behavior for the category by other related consumers, or other data as will be apparent to persons having skill in the relevant art.

The processing unit 204 may be configured to apply a spending limit on the account profile 210 related to the consumer 102 for the spending category that is based on the generated budget. In embodiments where the processing server 108 may process transactions, the processing unit 204 may evaluate received transactions that include spending in the spending category and approve or deny transactions accordingly based on transaction amounts for the transactions and the spending limit. In other embodiments, the transmitting unit 206 may transmit the spending limit to the payment network 112 or other suitable entity for use in limiting transactions initiated by the consumer 102 for the spending category to the spending limit.

The spending limit may be applied to the spending category for the account profile 210 for a first period of time based on the generated budget. The period of time may be a day, week, month, quarter, etc., or any other suitable period of time. After the first period of time, the processing unit 204 may decrease the spending limit based on the generated budget, and the decreased spending limit applied to the spending in the spending category for a second period of time. The second period of time may be the same length as the first period of time, or may be a different period, as specified in the budget and based on the consumer's 102 request, transaction history, and transaction history of other consumers. The processing unit 204 may be configured to continue to decrease the spending limit after periods of time until the spending target is reached.

Account Database

Figure 3:
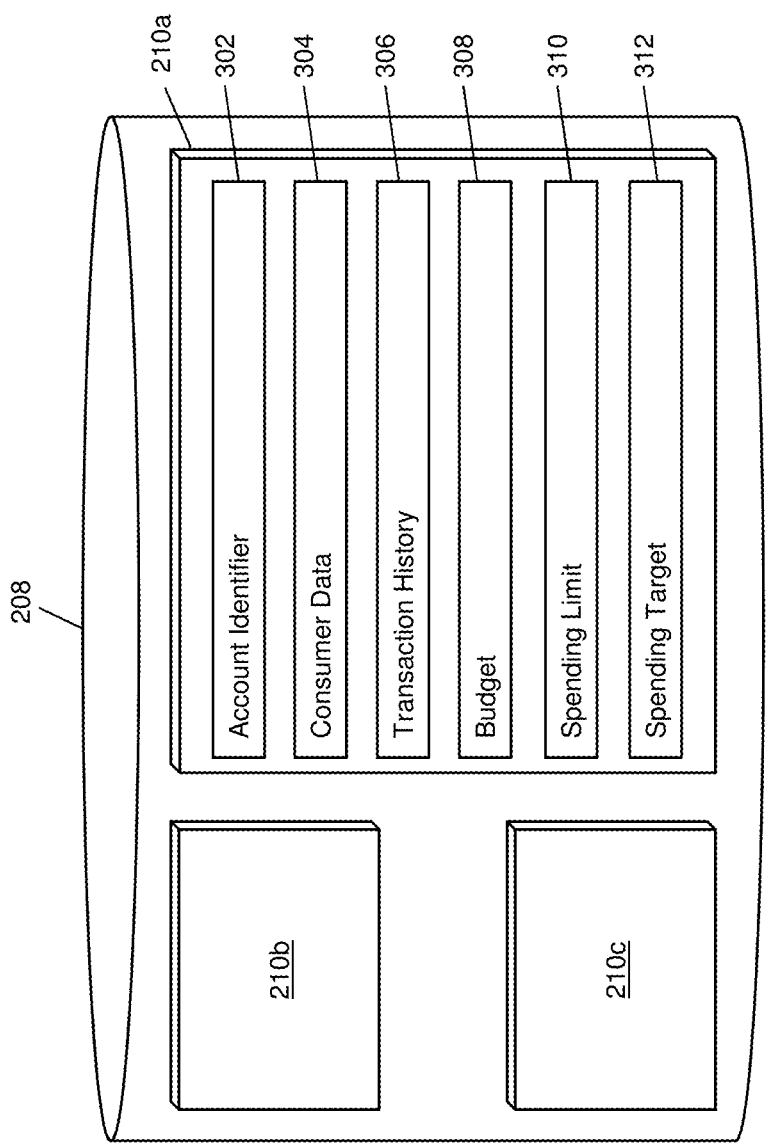
FIG. 3 is a block diagram illustrating the account database of the processing server of FIG. 2 for storing account profiles for budgets and self-imposed spending limits in accordance with exemplary embodiments.

FIG. 3 is an illustration of the account database 208 of the processing server 108. As discussed above, the account database 208 may be configured to store a plurality of account profiles 210, illustrated in FIG. 3 as account profiles 210a, 210b, and 210c.

Each account profile 210 may include data related to a transaction account and/or consumer 102 including an account identifier 302, consumer data 304, and transaction history 306. The account identifier 302 may be a unique value suitable for identification of the account profile 210 and/or the related consumer 102 or transaction account, such as an identification number, transaction account number, payment card number, serial number, username, e-mail address, telephone number, etc.

The consumer data 304 may include data associated with the related consumer 102. The consumer data 304 may include demographic data (e.g., age, gender, income, occupation, education, familial status, marital status, residential status, zip code, postal code, etc.), spending data (e.g., spending behaviors), consumer preferences (e.g., spending levels), economic data (e.g., income), etc.

The transaction history 306 may include data related to a plurality of payment transactions involving the related consumer 102 and/or transaction account. The transaction history may include transaction data for each payment transaction, which may include a transaction amount, transaction time and/or date, consumer data, merchant data, geographic location data, point of sale data, offer or coupon data, etc.

In some embodiments, an account profile 210 may also include a budget 308, such as generated for the account profile 210 by the processing unit 204. The budget 308 may include an overall budget and/or a budget for one or more spending categories. In some embodiments, an account profile 210 may also include a spending limit 310 and a spending target 312. The spending limit 310 may be a limit imposed on a spending category for a period of time, based on a budget generated by the processing unit 204 in response to a received spending limit request for the account profile 210. The spending target 312 may be the target set by the consumer 102 that is to be reached via decreases in the spending limit 310 over time.

Process for Generating an Assisted Categorized Budget

Figure 4:
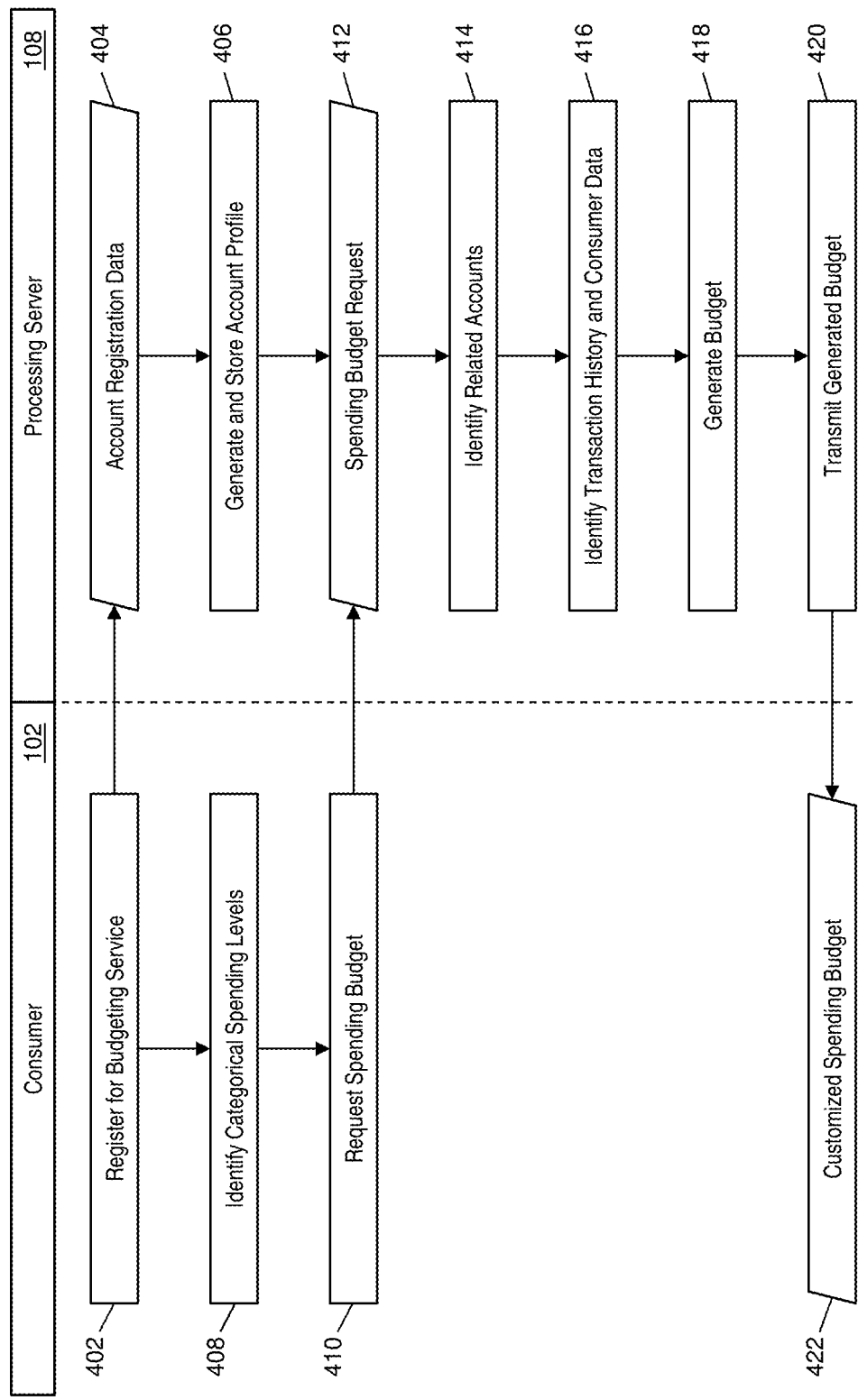
FIG. 4 is a flow diagram illustrating a process for calculating an assisted categorized budget using the system of FIG. 1 in accordance with exemplary embodiments.

FIG. 4 illustrates a process for the generating of an assisted categorized budget for the consumer 102 by the processing server 108.

In step 402, the consumer 102 may register for the budgeting service offered by the processing server 108, such as using the computing device 106. In step 404, the receiving unit 202 of the processing server 108 may receive account registration data from the consumer 102 as part of the registration. The registration data may include an account identifier 302 and consumer data 304. In step 406, the processing unit 204 of the processing server 108 may generate an account profile 210 and store it in the account database 208. In some embodiments, the registration data may also include transaction history 306. In other embodiments, the processing server 108 may request (e.g., via the transmitting unit 206) the transaction history 306 from the payment network 112 using the account identifier.

In step 408, the consumer 102 may identify desired spending levels for one or more spending categories. For example, the consumer 102 may desire a high level of spending for clothing, but a low level of spending for fast food. In step 410, the consumer 102 may submit a request for a spending budget to the processing server 108. In step 412, the receiving unit 202 of the processing server 108 may receive the spending budget request. The spending budget request may include at least the identified desired spending levels, and any other suitable data.

In step 414, the processing unit 204 of the processing server 108 may identify account profiles 210 that are related to the account profile 210 generated and stored for the consumer 102. Related account profiles 210 may be identified via correspondence between the consumer data 304 in the related account profile 210 and the consumer data 304 for the consumer 102, correspondence between the transaction history 306, and other similarities. In step 416, the processing unit 204 of the processing server 108 may identify the consumer data and transaction history for the consumer 102 as stored in the consumer's account profile 210.

In step 418, the processing unit 204 of the processing server 108 may generate a budget 308 for the consumer 102. The budget 308 may include a categorized budget for a plurality of spending categories. The categorized budget may be based on the past spending of the consumer 102, the past spending of the related account profiles 210, and preferences of the consumer 102 as included in the received spending budget request. In some embodiments, the processing unit 204 may store the budget 308 in the account profile 210 associated with the consumer 102.

In step 420, the transmitting unit 206 of the processing server 108 may transmit the generated budget 308 to the consumer 102. The consumer 102 may receive the budget, in step 422, and then use the budget going forward to manage their spending.

Process for Enforcing a Self-Imposed Spending Limit

Figure 5:
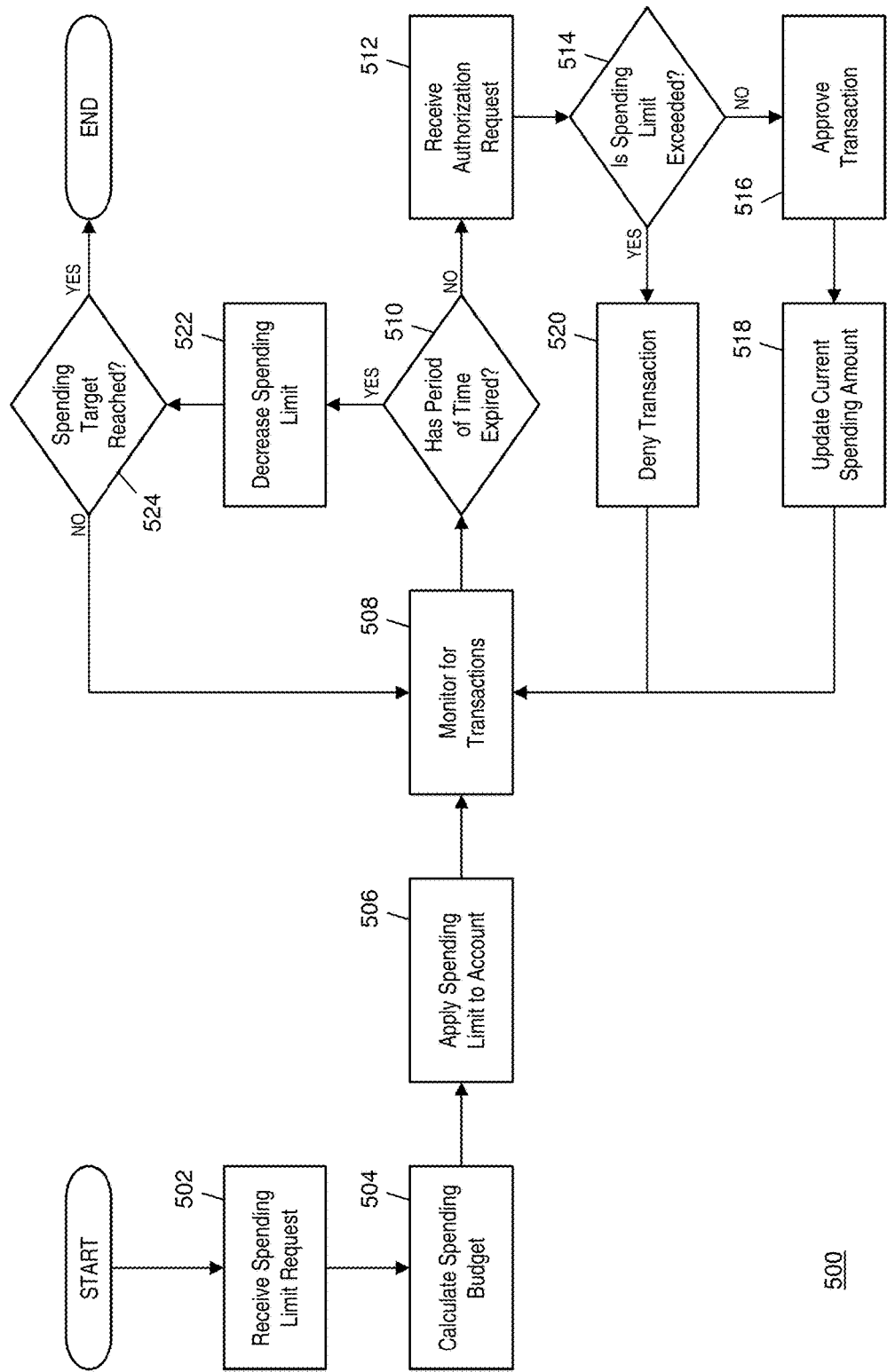
FIG. 5 is a flow diagram illustrating a process for imposing spending limits to lower purchase spending using the processing server of FIG. 2 in accordance with exemplary embodiments.

FIG. 5 illustrates a method 500 for the enforcement of a spending limit self-imposed by the consumer 102 on a transaction account.

In step 502, the receiving unit 202 of the processing server 108 may receive a spending limit request from the consumer 102 (e.g., via the computing device 106). The spending limit request may include at least a spending target and a spending category. In step 504, the processing unit 204 of the processing server 108 may calculate a spending budget for the spending category indicated in the spending limit request. The spending budget may include at least a starting spending limit and first period of time, and may further include additional spending limits and periods of time prior to reaching the spending target. In some instances, the spending limit request may specify one or more criteria to be used in the calculating of the spending budget, such as length of overall time, length of time periods, or rate of decrease.

In step 506, the processing unit 204 may apply the first spending limit to the account profile 210. In some embodiments, the processing unit 204 may be configured to apply the spending limit to the payment card 104 as a spending control. In other embodiments, the processing unit 204 may identify a controlled payment number to be used by the consumer 102, which may be subject to the spending limit. Methods and systems for enforcing a spending limit for a spend category using controlled payment numbers will be apparent to persons having skill in the relevant art.

In step 508, the processing unit 204 may wait and monitor for new payment transactions to be initiated by the consumer 102 using the payment card 104. In step 510, the processing unit 204 may determine if the period of time for the currently applied spending limit has expired. If the period of time has not expired, then, in step 512, the processing unit 204 may continue to monitor until an authorization request for a payment transaction is received. Once the authorization request is received by the receiving unit 202, the processing unit 204 may determine if the spending limit is exceeded based on the transaction amount for the payment transaction as indicated in the authorization request.

If the spending limit is not exceeded, then, in step 516, the transaction may be approved by the processing unit 204 and then processed accordingly using methods and systems that will be apparent to persons having skill in the relevant art. In step 518, the processing unit 204 may update the progress towards the current spending amount based on the transaction amount. If the spending limit is exceeded by the transaction, then, in step 520, the transaction may be denied. In some embodiments, the transmitting unit 206 may transmit a notification to the consumer 102 (e.g., via the computing device 102) indicating that the transaction is denied due to the spending limit.

After the transaction has been denied or processed, the process may return to step 508 where the processing unit 204 may continue to monitor for transactions until the period of time has expired. Once the period of time has expired, then, in step 522, the processing unit 204 may decrease the spending limit based on the earlier calculated budget. In step 524, the processing unit 204 may determine if the spending limit has reached the consumer's 102 spending target. If the spending target has not been reached, the process may return to step 508 for monitoring regarding the lower spending limit and a new period of time. If the spending target has been reached, then the process 500 may be completed.

Graphical User Interfaces

Figure 6:
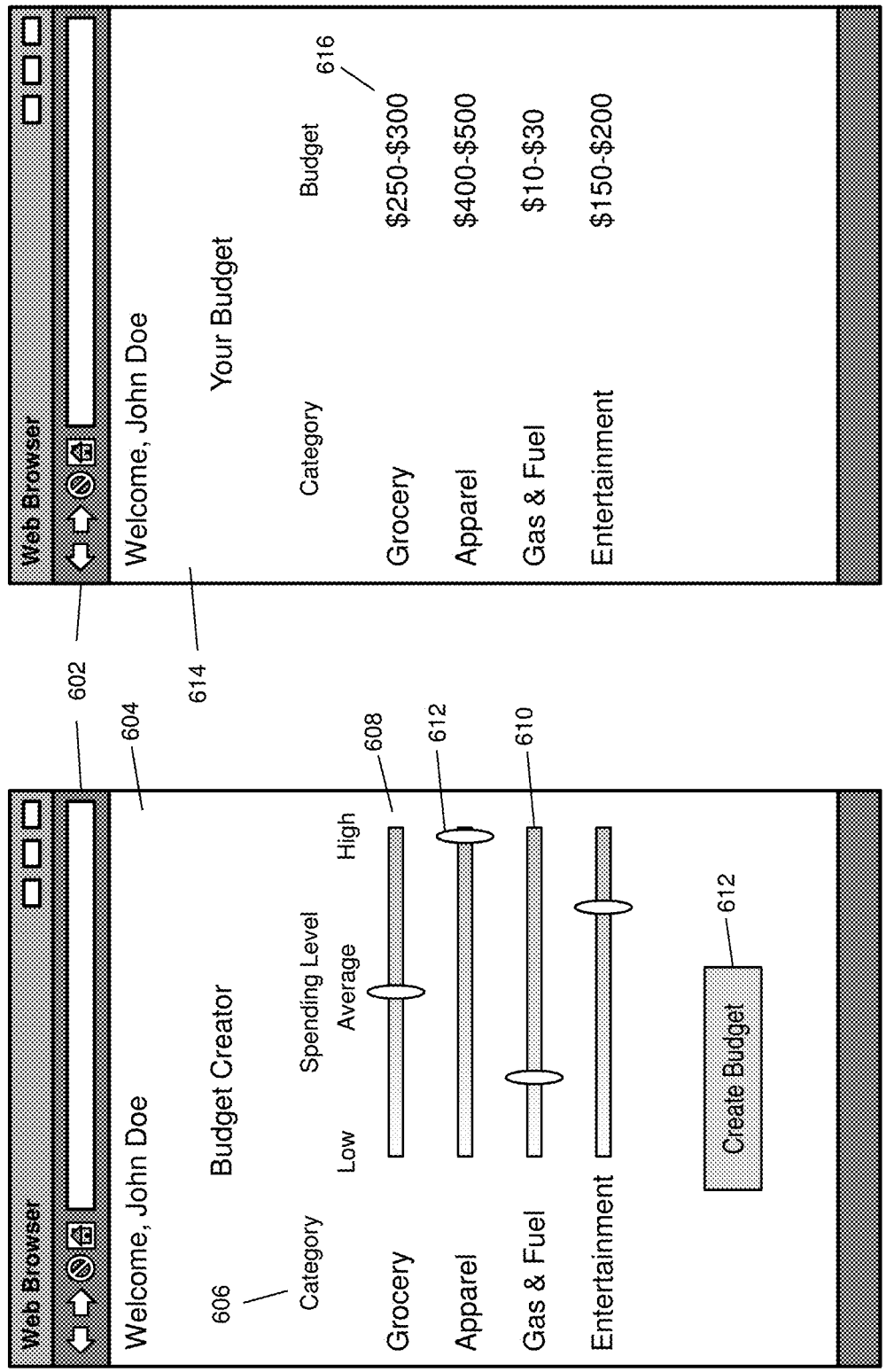
FIGS. 6A and 6B are diagrams illustrating a graphical user interface for the creation of an assisted categorized budget in accordance with exemplary embodiments.

FIGS. 6A and 6B illustrate a graphical user interface of the computing device 106 for use by the consumer 102 in requesting an assisted categorized budget.

FIG. 6A includes an illustration of a web browsing application program 602, such as may be executed by the computing device 106. The web browsing application program 602 may display a web page operated by or on behalf of the processing server 108 for the generation of an assisted categorized budget, such as the budget creation page 604.

The budget creation page 604 may include a plurality of categories 606. Each category 606 may correspond to a spending category for which a budget 308 for the consumer will be created. In the example illustrated in FIG. 6A, there may be categories for grocery spending, apparel spending, gas & fuel spending, and entertainment spending. The budget creation page 604 may also include a plurality of spending level selectors 608. Each spending level selector 608 may include a sliding bar 610 and a slider 612.

The sliding bar 610 may represent a bar for which the slider 612 may be moved along to select a level of spending for the corresponding category 606 desired by the consumer 102. For instance, in the example illustrated in FIG. 6A, the consumer 102 may drag the slider 612 to the right side of the sliding bar 610 to indicate a desire for a high level of spending for the respective category 606, such as a high level of spending in the apparel category in the illustrated example.

The budget creation page 604 may also include a create budget button 612. The create budget button 612, when interacted with by the consumer 102, may send the information selected in the budget creation page 604 (e.g., the spending levels) to the processing server 108 for creation of a budget 308 for the consumer 102. Once the budget 308 has been created, the consumer 102 may be presented with the budget display page 614, illustrated in FIG. 6B.

The budget display page 614 may include a plurality of budget amounts 616. Each budget amount 616 may correspond to a category 606 and may indicate an estimated budget for the consumer 102 to follow for the particular category 606 based on the consumer's selected levels, the consumer's transaction history 306, and the transaction history 306 of other related consumers.

Figure 7:
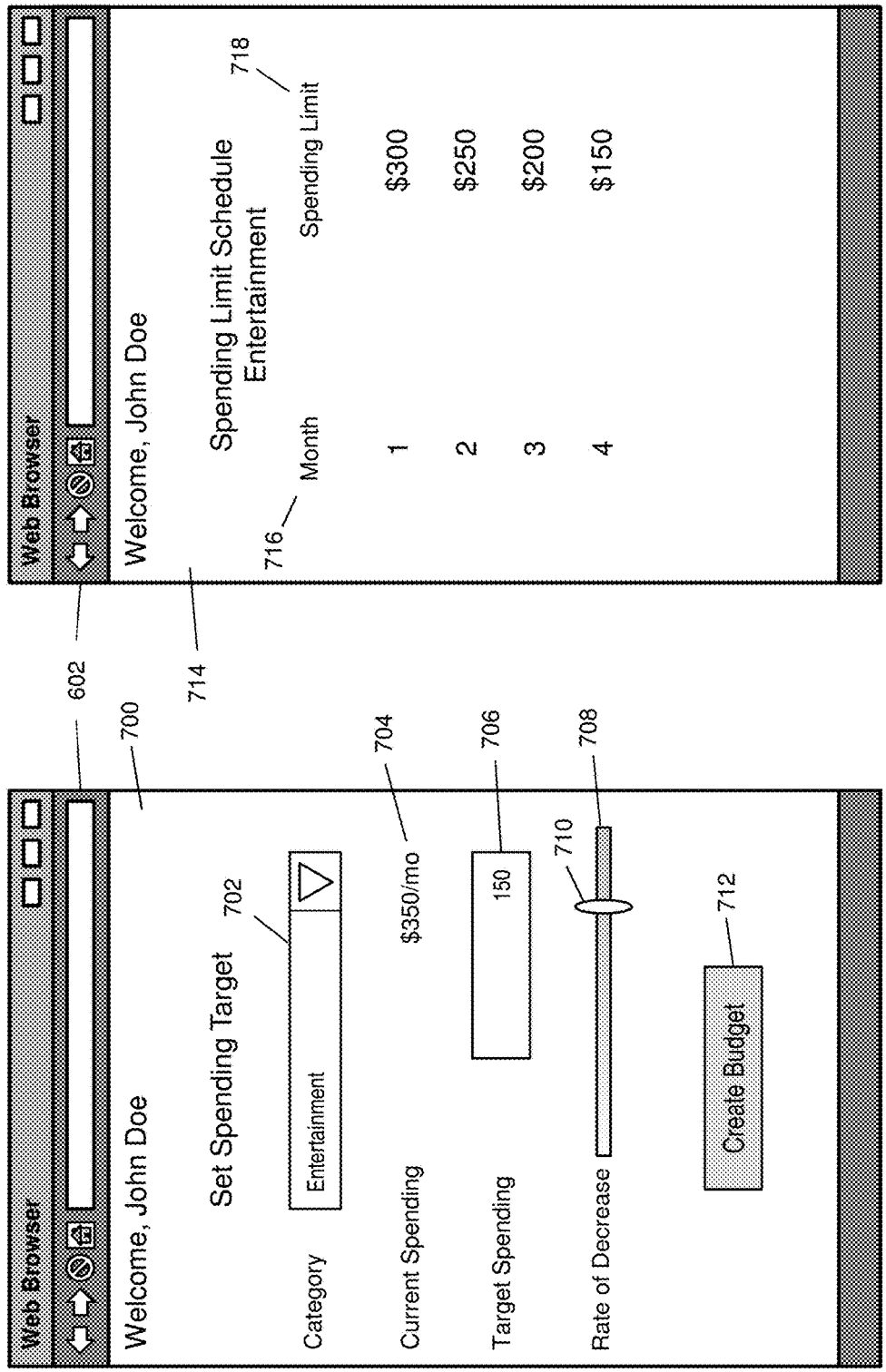
FIGS. 7A and 7B are diagrams illustrating a graphical user interface for the creation and implementation of self-imposed spending limits in accordance with exemplary embodiments.

FIGS. 7A and 7B illustrate a graphical user interface for the requesting of a spending limit to be placed on a transaction account by the consumer 102 for a particular spending category.

FIG. 7A illustrates a spending limit request page 700. The spending limit request page 700 may include a category selector 702. The category selector 702 may be used to select a spending category for which the consumer 102 desires to impose a spending limit, such as entertainment spending as illustrated in the example in FIG. 7A. The spending limit request page 700 may also include a current spending amount 704. The current spending amount 704 may represent the consumer's 102 current spending in the selected category, such as based on the transaction history 306 for the consumer 102 stored in the consumer's 102 account profile 210.

The spending limit request page 700 may further include a spending target 706. The spending target 706 may be input by the consumer 102 and may be the desired spending target 706 the consumer 102 wishes to reach via the imposition of a spending limit on the spending for the selected category. The spending limit request page 700 may also include a rate of decrease sliding bar 708 with a slider 710, which may be used by the consumer 102 to indicate how quickly the consumer 102 would like to reach the spending target 706 from their current spending amount 704.

The spending limit request page 700 may also include a create budget button 712. The create budget button 712, when interacted with by the consumer 102, may send the information selected in the spending limit request page 700 to the processing server 108 for creation of a budget for the imposition of a spending limit for the selected category for the consumer 102. Once the budget has been created, the consumer 102 may be presented with the spending limit schedule page 714, illustrated in FIG. 7B.

The spending limit schedule page 714 may include a listing 716 of periods of time and a listing 718 of corresponding spending limits. The periods of time in the listing 716 may be periods for which the corresponding spending limit from the listing 718 applies. Each spending limit in the listing 718 may be a spending limit for the corresponding period for the selected category. For instance, in the example illustrated in FIG. 7B, each spending limit may be for one month, and the spending limit may decrease by $50 each month until the spending target of $150 is reached in the fourth month.

It will be apparent to persons having skill in the relevant art that the user interfaces illustrated in FIGS. 6A, 6B, 7A, and 7B and discussed herein are provided as examples only, and that additional and/or alternative interfaces and/or features may be included. For example, the spending limit request page 700 may further or alternative include a field for the entry of a requested overall length of time or period length for the application of a spending limit.

Exemplary Method for Imposing Spending Limits to Lower Purchase Spending

Figure 8:
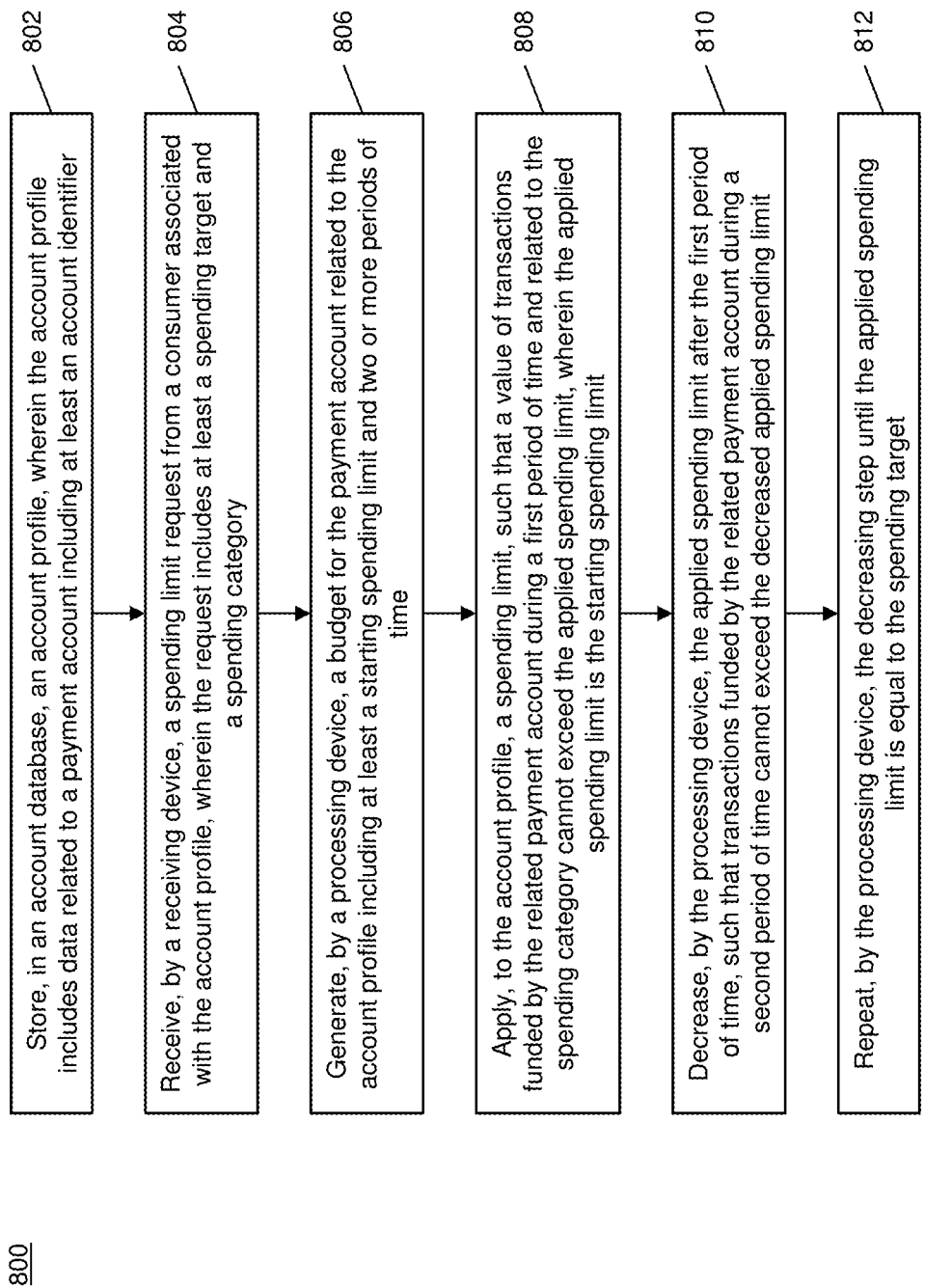
FIG. 8 is a flow chart illustrating an exemplary method for imposing spending limits to lower purchase spending in accordance with exemplary embodiments.

FIG. 8 illustrates a method 800 for the imposing of spending limits to lower purchase spending for a consumer based on a consumer's spending limit request.

In step 802, an account profile (e.g., the account profile 210) may be stored in an account database (e.g., the account database 208), wherein the account profile 210 includes data related to a payment account including at least an account identifier (e.g., the account identifier 302). In step 804, a spending limit request may be received from a consumer (e.g., the consumer 102) associated with the account profile 210 by a receiving device (e.g., the receiving unit 202), wherein the request includes at least a spending target and a spending category.

In step 806, a budget (e.g., the budget 308) may be generated, by a processing device (e.g., the processing unit 204), for the payment account related to the account profile 210 including at least a starting spending limit and two or more periods of time. In one embodiment, each of the two or more periods of time may be of an equal length. In some embodiments, the account profile 210 may further include consumer data (e.g., consumer data 304) and transaction history (e.g., transaction history 306), and the starting spending limit and two or more periods of time may be generated for the budget 308 based on the consumer data 304 and transaction history 306 included in the account profile 210.

In one embodiment, the spending limit request may further include the two or more periods of time. In another embodiment, the spending limit request may include a target time, and the two or more periods of time may be generated for the budget 308 such that the applied spending limit is equal to the spending target at the target time. In some embodiments, the spending limit request may further include the starting spending limit.

In step 808, a spending limit may be applied to the account profile 210 such that a value of transactions funded by the related payment account during a first period of time and related to the spending category cannot exceed the applied spending limit, and wherein the applied spending limit is the starting spending limit. In step 810, the applied spending limit may be decreased by the processing device 204 after the first period of time, such that transactions funded by the related payment account during a second period of time cannot exceed the decreased applied spending limit. In one embodiment, the applied spending limit may be decreased at least one of: linearly, exponentially, and discretely over the two or more periods of time.

In step 812, the decreasing step 810 may be repeated by the processing device 204 until the applied spending limit is equal to the spending target. In some embodiments, the spending target may identify a level of spending, generating the budget 308 may further include identifying an amount corresponding to the identified level of spending, and the decreasing step 810 may be repeated until the applied spending limit is equal to the amount corresponding to the identified level of spending.

In one embodiment, the account profile 210 may further include consumer data 304 and transaction history 306, and the generated budget 308 may be based on at least the spending target and the spending category included in the received spending limit request and the consumer data 304 and transaction history 306 stored in the account profile 210. In a further embodiment, the method 800 may further include: storing, in the account database 208, a plurality of additional account profiles 210, each additional account profile 210 including data related to another payment account including at least transaction history 306 and consumer characteristic data (e.g., consumer data 304); and identifying, in the account database 208, one or more additional account profiles 210 based on a correspondence between the consumer data 304 included in the account profile 210 and the consumer characteristic data included in the one or more additional account profiles 210, wherein the generated budget is further based on the transaction history included in the identified one or more additional account profiles 210.

Exemplary Method for Calculating an Assisted Categorized Budget

Figure 9:
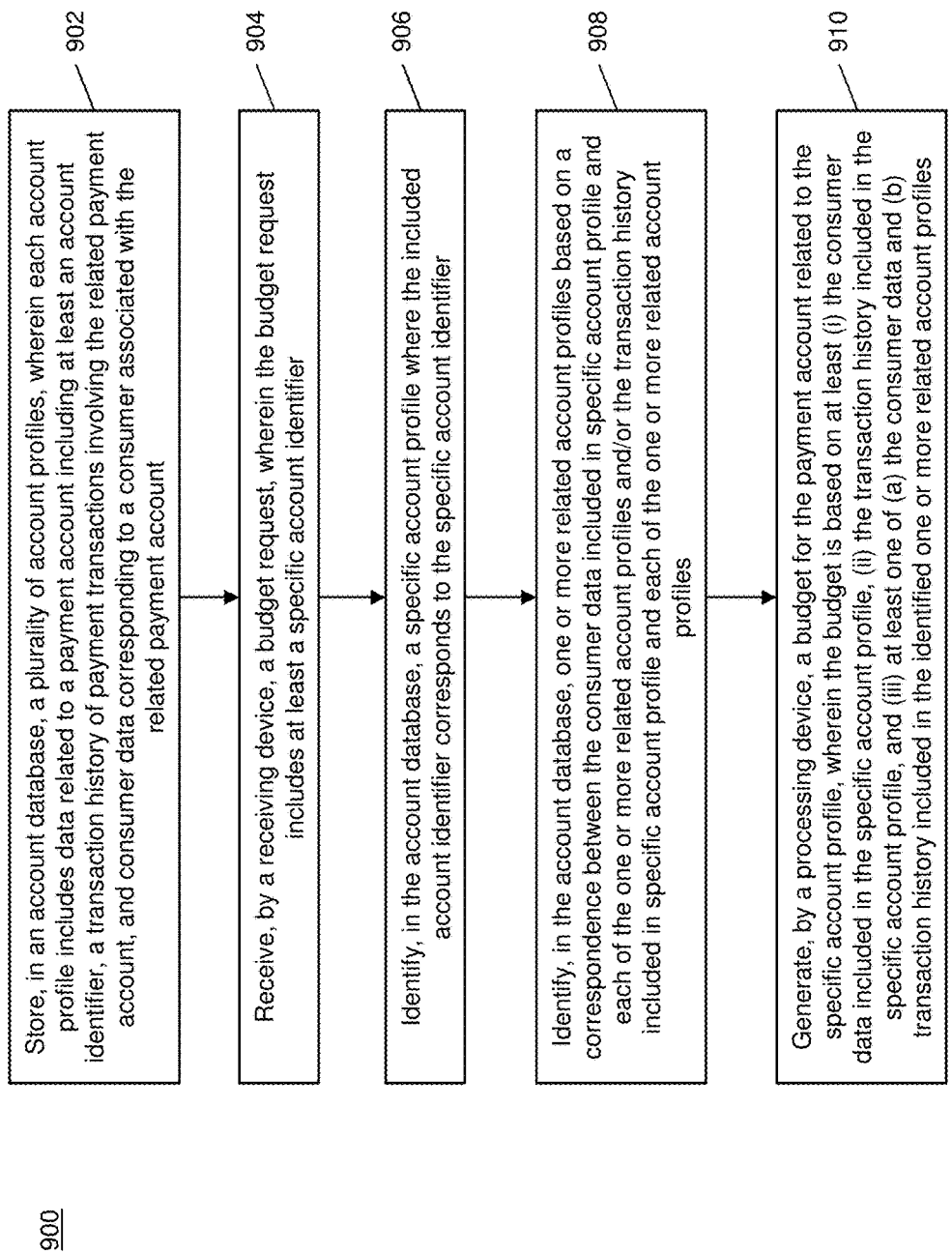
FIG. 9 is a flow chart illustrating an exemplary method for calculating an assisted categorized budget in accordance with exemplary embodiments.

FIG. 9 illustrates a method 900 for calculating an assisted categorized budget based on consumer data and transaction history and transaction history of related consumers.

In step 902, a plurality of account profiles (e.g., account profiles 210) may be stored in an account database (e.g., the account database 208), wherein each account profile 210 includes data related to a payment account including at least an account identifier (e.g., account identifier 302), a transaction history (e.g., the transaction history 306) of payment transactions involving the related payment account, and consumer data (e.g., consumer data 304) corresponding to a consumer (e.g., the consumer 102) associated with the related payment account. In step 904, a budget request may be received by a receiving device (e.g., the receiving unit 202), wherein the budget request includes at least a specific account identifier.

In step 906, a specific account profile may be identified in the account database 208 where the included account identifier 302 corresponds to the specific account identifier. In step 908, one or more related account profiles may be identified in the account database 208 based on a correspondence between the consumer data 304 included in the specific account profile and each of the one or more related account profiles and/or the transaction history 306 included in the specific account profile and each of the one or more related account profiles.

In step 910, a budget (e.g., the budget 308) may be generated, by a processing device (e.g., the processing unit 204) for the payment account related to the specific account profile, wherein the budget 308 is based on at least (i) the consumer data 304 included in the specific account profile, (ii) the transaction history included in the specific account profile, and (iii) at least one of (a) the consumer data 304 and (b) transaction history included in the identified one or more related account profiles. In some embodiments, the budget may be further based on budget data included in each account profile of the identified one or more related account profiles.

In one embodiment, the processing device 204 may be configured to generate the budget 308 using one or more models or algorithms. In a further embodiment, the one or more model algorithms may use at least one of: a decision tree, a general linear model, and basic indexing. In some embodiments, the method 900 may further include transmitting, by a transmitting device (e.g., the transmitting unit 206), the generated budget 308 in response to the received budget request.

In one embodiment, the generated budget 308 may include at least an overall budget and a category budget for each of a plurality of spending categories. In a further embodiment, the category budget for each of the plurality of spending categories may be based on at least a category budget for each of the plurality of spending categories included in the identified one or more related account profiles. In another further embodiment, the category budget for each of the plurality of spending categories may be based on a spending level for the corresponding category. In an even further embodiment, the received budget request may include the spending level for each spending category. In another even further embodiment, the spending level for each spending category may be based on payment transactions included in the transaction history 306 included in the specific account profile associated with the respective spending category.

Computer System Architecture

Figure 10:
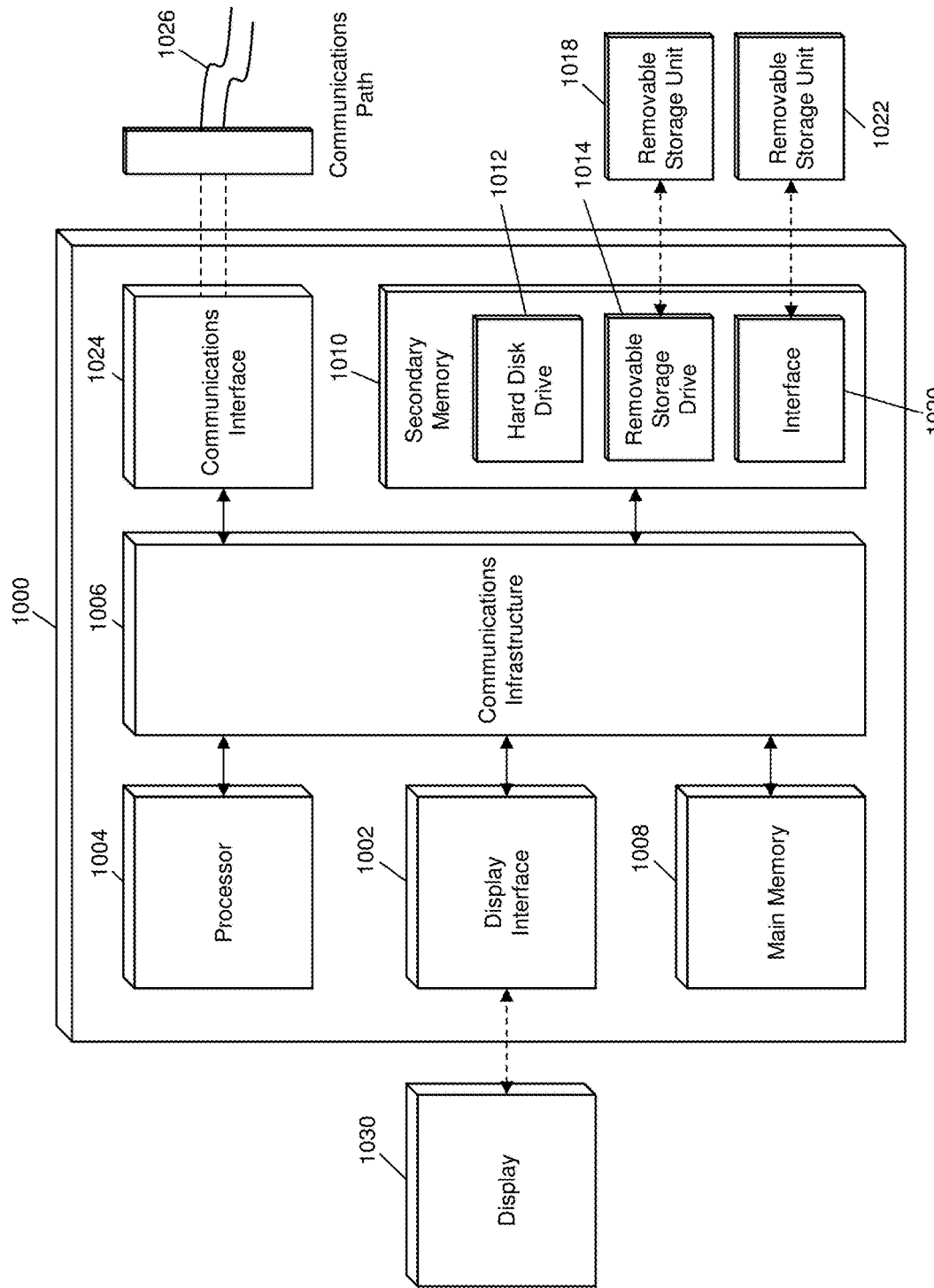
FIG. 10 is a block diagram illustrating a computer system architecture in accordance with exemplary embodiments.

FIG. 10 illustrates a computer system 1000 in which embodiments of the present disclosure, or portions thereof, may be implemented as computer-readable code. For example, the processing server 108 of FIG. 1 may be implemented in the computer system 1000 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4, 5, 8, and 9.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1018, a removable storage unit 1022, and a hard disk installed in hard disk drive 1012.

Various embodiments of the present disclosure are described in terms of this example computer system 1000. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general purpose processor device. The processor device 1004 may be connected to a communications infrastructure 1006, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1000 may also include a main memory 1008 (e.g., random access memory, read-only memory, etc.), and may also include a secondary memory 1010. The secondary memory 1010 may include the hard disk drive 1012 and a removable storage drive 1014, such as a floppy disk drive, a magnetic tape drive, an optical disk drive, a flash memory, etc.

The removable storage drive 1014 may read from and/or write to the removable storage unit 1018 in a well-known manner. The removable storage unit 1018 may include a removable storage media that may be read by and written to by the removable storage drive 1014. For example, if the removable storage drive 1014 is a floppy disk drive or universal serial bus port, the removable storage unit 1018 may be a floppy disk or portable flash drive, respectively. In one embodiment, the removable storage unit 1018 may be non-transitory computer readable recording media.

In some embodiments, the secondary memory 1010 may include alternative means for allowing computer programs or other instructions to be loaded into the computer system 1000, for example, the removable storage unit 1022 and an interface 1020. Examples of such means may include a program cartridge and cartridge interface (e.g., as found in video game systems), a removable memory chip (e.g., EEPROM, PROM, etc.) and associated socket, and other removable storage units 1022 and interfaces 1020 as will be apparent to persons having skill in the relevant art.

Data stored in the computer system 1000 (e.g., in the main memory 1008 and/or the secondary memory 1010) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1000 may also include a communications interface 1024. The communications interface 1024 may be configured to allow software and data to be transferred between the computer system 1000 and external devices. Exemplary communications interfaces 1024 may include a modem, a network interface (e.g., an Ethernet card), a communications port, a PCMCIA slot and card, etc. Software and data transferred via the communications interface 1024 may be in the form of signals, which may be electronic, electromagnetic, optical, or other signals as will be apparent to persons having skill in the relevant art. The signals may travel via a communications path 1026, which may be configured to carry the signals and may be implemented using wire, cable, fiber optics, a phone line, a cellular phone link, a radio frequency link, etc.

The computer system 1000 may further include a display interface 1002. The display interface 1002 may be configured to allow data to be transferred between the computer system 1000 and external display 1030. Exemplary display interfaces 1002 may include high-definition multimedia interface (HDMI), digital visual interface (DVI), video graphics array (VGA), etc. The display 1030 may be any suitable type of display for displaying data transmitted via the display interface 1002 of the computer system 1000, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1008 and secondary memory 1010, which may be memory semiconductors (e.g., DRAMs, etc.). These computer program products may be means for providing software to the computer system 1000. Computer programs (e.g., computer control logic) may be stored in the main memory 1008 and/or the secondary memory 1010. Computer programs may also be received via the communications interface 1024. Such computer programs, when executed, may enable computer system 1000 to implement the present methods as discussed herein. In particular, the computer programs, when executed, may enable processor device 1004 to implement the methods illustrated by FIGS. 4, 5, 8, and 9, as discussed herein. Accordingly, such computer programs may represent controllers of the computer system 1000. Where the present disclosure is implemented using software, the software may be stored in a computer program product and loaded into the computer system 1000 using the removable storage drive 1014, interface 1020, and hard disk drive 1012, or communications interface 1024.

Techniques consistent with the present disclosure provide, among other features, systems and methods for imposing spending limits and calculating assisted categorized budgets. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A computer-implemented method for imposing spending limits in the processing of electronic payment transactions, comprising:

storing, in an account database of a processing server, an account profile, wherein the account profile includes data related to a payment account including at least an account identifier;

receiving, by a receiving device of the processing server, a spending limit request from a consumer device, wherein the request is associated with the account profile and the request includes at least a spending target and a spending category;

generating, by a processing device of the processing server, a budget for the payment account related to the account profile including at least a starting spending limit and two or more defined periods of time, wherein (i) the two or more defined periods of time comprise at least a first period of time and a second period of time and (ii) the starting spending limit is greater than the spending target;

applying, by the processing device and to the account profile, a spending limit, such that a value of transactions funded by the related payment account during the first period of time and related to the spending category cannot exceed the applied spending limit, wherein the applied spending limit during the first period of time is equal to the starting spending limit;

decreasing, by the processing device, the applied spending limit, after the first period of time, such that transactions funded by the related payment account during the second period of time cannot exceed the decreased applied spending limit; and decreasing, by the processing device, the applied spending limit until the applied spending limit is equal to the spending target or a value associated with the spending target.

2. The method of claim 1, wherein each of the two or more defined periods of time are of an equal length.

3. The method of claim 1, wherein the applied spending limit is decreased at least one of: linearly, exponentially, and discretely over the two or more defined periods of time.

4. The method of claim 1, wherein
the account profile further includes consumer data and transaction history, and
the starting spending limit and two or more defined periods of time are generated for the budget based on the consumer data and transaction history included in the account profile.

5. The method of claim 1, wherein the spending limit request further includes at least one of: the two or more defined periods of time and the starting spending limit.

6. The method of claim 1, wherein
the spending limit request further includes a target time, and
the two or more defined periods of time are generated for the budget such that the applied spending limit is equal to the spending target at the target time.

7. The method of claim 1, wherein
the spending target identifies a level of spending,
generating the budget further includes identifying an amount corresponding to the identified level of spending, and
the decreasing step is repeated until the applied spending limit is equal to the identified amount corresponding to the identified level of spending.

8. The method of claim 1, wherein
the account profile further includes consumer data and transaction history, and
the generated budget is based on at least the spending target and the spending category including in the received spending limit request and the consumer data and the transaction history stored in the account profile.

9. The method of claim 8, further comprising:
storing, in the account database, a plurality of additional account profiles, each additional account profile including data related to another payment account including at least transaction history and consumer characteristic data; and
identifying, by the processing device and in the account database, one or more additional account profiles based on a correspondence between the consumer data included in the account profile and the consumer characteristic data included in the one or more additional account profiles, wherein
the generated budget is further based on the transaction history included in the identified one or more additional account profiles.

10. The method of claim 1, further comprising:
receiving, by the receiving device and from a merchant point of sale device, an authorization request for a payment transaction to be funded by the payment account of the account profile;
determining, by the processing device, that the transaction value of the received authorization request exceeds the applied spending limit for the time period during which the authorization request is received;
denying, by the processing device, further processing of the payment transaction, based upon the determining step; and
transmitting, by the processing device and to a consumer device, a notification that the transaction is denied.

11. A system for imposing spending limits in the processing of electronic payment transactions, comprising:
account database configured to store an account profile, wherein the account profile includes data related to a payment account including at least an account identifier;
a receiving device configured to receive a spending limit request from a consumer device, wherein the request is associated with the account profile and the request includes at least a spending target and a spending category; and
a processing device configured to
identify a budget for the payment account related to the account profile including at least a starting spending limit and two or more defined periods of time, wherein (i) the two or more defined periods of time comprise at least a first period of time and a second period of time and (ii) the starting spending limit is greater than the spending target,
apply, to the account profile, a spending limit, such that a value of transactions funded by the related payment account during the first period of time and related to the spending category cannot exceed the applied spending limit, wherein the applied spending limit during the first period of time is equal to the starting spending limit,
decrease the applied spending limit after the first period of time, such that transactions funded by the related payment account during the second period of time cannot exceed the decreased applied spending limit, and
decrease the applied spending limit until the decreased applied spending limit is equal to the spending target or a value associated with the spending target.

12. The system of claim 11, wherein each of the two or more defined periods of time are of an equal length.

13. The system of claim 11, wherein the applied spending limit is decreased at least one of: linearly, exponentially, and discretely over the two or more defined periods of time.

14. The system of claim 11, wherein
the account profile further includes consumer data and transaction history, and
the starting spending limit and two or more defined periods of time are generated for the budget based on the consumer data and transaction history included in the account profile.

15. The system of claim 11, wherein the spending limit request further includes at least one of: the two or more defined periods of time and the starting spending limit.

16. The system of claim 11, wherein
the spending limit request further includes a target time, and
the two or more defined periods of time are generated for the budget such that the applied spending limit is equal to the spending target at the target time.

17. The system of claim 11, wherein
the spending target identifies a level of spending,
generating the budget further includes identifying an amount corresponding to the identified level of spending, and
the decreasing step is repeated until the applied spending limit is equal to the identified amount corresponding to the identified level of spending.

18. The system of claim 11, wherein
the account profile further includes consumer data and transaction history, and
the generated budget is based on at least the spending target and the spending category including in the received spending limit request and the consumer data and the transaction history stored in the account profile.

19. The system of claim 18, wherein
the account database is further configured to store a plurality of additional account profiles, each additional account profile including data related to another payment account including at least transaction history and consumer characteristic data,
the processing device is further configured to identify, in the account database, one or more additional account profiles based on a correspondence between the consumer data included in the account profile and the consumer characteristic data included in the one or more additional account profiles, and
the generated budget is further based on the transaction history included in the identified one or more additional account profiles.

20. The system of claim 11, wherein:
the receiving device is further configured to receive, from a merchant point of sale device, an authorization request for a payment transaction to be funded by the payment account of the account profile; and
the processing device is further configured to:
determine that the transaction value of the received authorization request exceeds the applied spending limit for the time period during which the authorization request is received,
deny further processing of the payment transaction, based upon the determining step, and
transmit, to a consumer device, a notification that the transaction is denied.

* * * * *